United States Patent [19]

Shimirak

[11] Patent Number: 4,466,843
[45] Date of Patent: Aug. 21, 1984

[54] PROTECTION OF CABLE SPLICE

[75] Inventor: Gerald L. Shimirak, Pleasanton, Calif.

[73] Assignee: Raychem Corporation, Menlo Park, Calif.

[21] Appl. No.: 578,593

[22] Filed: Feb. 10, 1984

Related U.S. Application Data

[63] Continuation of Ser. No. 271,057, Jun. 8, 1981, abandoned.

[51] Int. Cl.³ .............................................. H01B 13/06
[52] U.S. Cl. .......................................... 156/48; 156/49; 156/53; 156/56; 174/23 R; 174/76; 174/88 R; 428/137; 428/304.4
[58] Field of Search ..................... 156/48, 49, 53, 56; 174/23 R, 76, 88 R, 92; 428/36, 137, 304.4

[56] References Cited

U.S. PATENT DOCUMENTS

| Re. 26,491 | 11/1968 | Colbert | 249/90 |
|---|---|---|---|
| 3,203,544 | 8/1965 | Gilbert | 206/47 |
| 3,361,605 | 1/1968 | Gilbert | 156/48 |
| 3,419,669 | 12/1968 | Dienes | 174/84 R |
| 3,455,336 | 7/1969 | Ellis | 138/99 X |
| 3,879,249 | 4/1975 | Filreis et al. | 156/48 X |
| 3,895,180 | 7/1975 | Plummer | 174/92 |
| 3,939,882 | 2/1976 | Gillemot | 141/231 |
| 3,944,183 | 3/1976 | Miller | 156/48 X |
| 3,992,569 | 11/1976 | Hankins et al. | 174/92 |
| 4,070,746 | 1/1978 | Evans et al. | 156/344 X |
| 4,135,553 | 1/1979 | Evans et al. | 428/36 X |
| 4,298,641 | 11/1981 | Boettcher | 428/36 |

Primary Examiner—Robert Dawson
Attorney, Agent, or Firm—T. Gene Dillahunty; Edith A. Rice; Herbert G. Burkard

[57] ABSTRACT

A splice between at least two multi-wire electric cables is protected from ingress of water by forming a compressible reservoir about the splice, filling the reservoir with a curable liquid sealant, compressing the reservoir to force the liquid sealant to penetrate into the interstices between the individual wires of the splice bundle and into the adjacent cable core and maintaining the reservoir under compression at least for a time sufficient for the sealant to cure.

9 Claims, 4 Drawing Figures

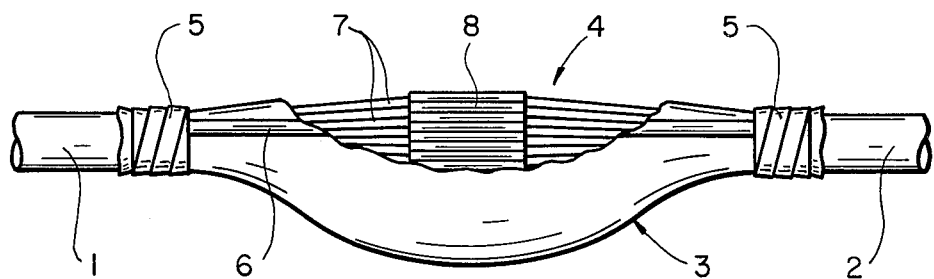
FIG_1
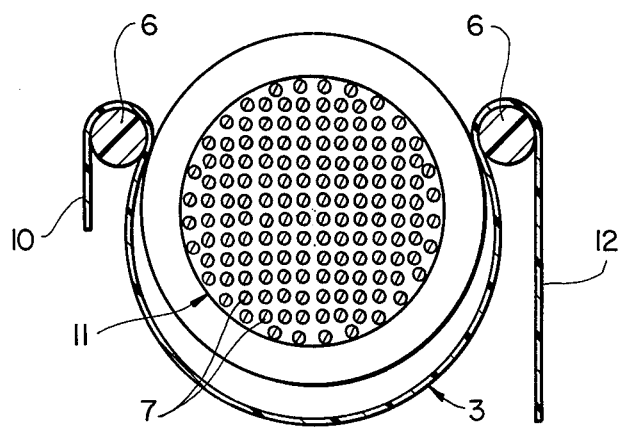
FIG_2

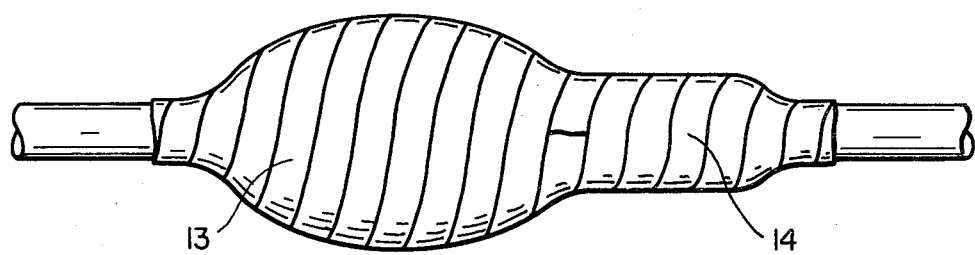
FIG_3
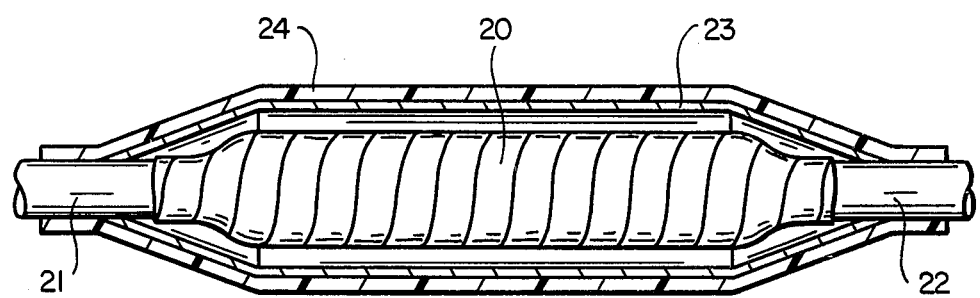
FIG_4

PROTECTION OF CABLE SPLICE

This application is a continuation of application Ser. No. 271,057, filed June 8, 1981, now abandoned.

BACKGROUND OF THE INVENTION

This invention relates to protecting a splice in multi-wire electrical cables, in particular communications cables, from ingress of water into the splice.

Multi-wire electrical cables comprise a core containing a plurality of individual insulated wire conductors, surrounded by an outer sheath. The cable core can contain from a few pairs of conductors up to several thousand pairs. The outer sheath generally consists of an outer plastic jacket surrounding a metallic shield. Additional inner polymeric layer or layers can be present. To protect the conductors from water, the interstices between the individual wire conductors can be filled with a filling compound, usually a grease based or petroleum jelly. Cables that are so filled are generally referred to as "filled" cables and cables that are not filled are generally referred to as "air core" cables. Air core cables can be pressurized to prevent ingress of water.

When a splice is made in a cable, the outer sheath is removed from the end of the cable. At least some of the individual wire conductors in the core of the cable are joined to conductors of another cable or cables. After completion of the splice, the entire splice area, that is the area of the cables where the sheath has been removed, must be protected. Generally, an enclosure or splice case is placed over the area. A preferred enclosure is a dimensionally recoverable polymeric sleeve, preferably a heat-shrinkable polymeric sleeve. An inner protective casing or lining can be positioned about the splice before installation of the sleeve to provide additional mechanical protection. Molded plastic or lead splice cases are also used.

The splice case can be filled with a suitable filling compound to protect the individual wire conductors in the core of the splice (referred to herein as the splice bundle or splice core). Such filling compounds can be curable liquid polymer systems or grease-like materials, generally based on petroleum jelly. Curable liquid polymer systems are used by pouring a curable liquid sealant into a splice case positioned about the splice and allowing it to cure. Particularly useful curable liquid sealants are two-part polyurethane systems comprising a prepolymer and a curing agent or hardener. When cured the filling compound solidifies, preferably to a gel-like consistency, forming a protective layer around the splice. It has been found that this technique doesn't adequately protect the splice from ingress of water, particularly if one of the cables contain 400 pairs or more of wire conductors. Seepage of water into the splice eventually causes electrical failure of the joined conductors.

SUMMARY OF THE INVENTION

It has now been discovered that a splice in multi-wire electric cables can be protected from water ingress if a curable liquid sealant is placed in a flexible reservoir surrounding the splice and subjected to compression while it is in the liquid state and maintained under compression for a time sufficient to permit cure of the liquid sealant to its hardened state.

This invention comprises a method of protecting a splice connecting at least two multi-wire electrical cables from ingress of water, each of said cables having an outer sheath of at least two layers of material and an inner core comprising a plurality of individual insulated wire conductors having interstices therebetween, which comprises:
(a) positioning a flexible reservoir about the splice, said reservoir having at least one opening therein and being sealed at each end thereof to the outer sheath of the cables adjacent said splice;
(b) introducing a curable liquid sealant into said reservoir through said opening and then closing said opening;
(c) compressing said reservoir thereby forcing said liquid sealant to penetrate into the core of said splice and into the core of said cables adjacent said splice; and
(d) maintaining said reservoir under compression for a period of time sufficient to permit said liquid sealant to cure thereby forming a water impenetrable seal.

BRIEF DESCRIPTION OF THE DRAWINGS

FIG. 1 illustrates a cable splice encompassed by a flexible reservoir for receiving curable liquid sealant.

FIG. 2 is an end view of the cable of FIG. 1 showing a reservoir formed from a plastic film supported by a pair of rods.

FIG. 3 shows compressing the filled reservoir by tightly wrapping it with suitable tape.

FIG. 4 shows the completed wrapped splice enclosed within a commercial splice case enclosure.

DETAILED DESCRIPTION OF THE INVENTION

In the practice of this invention, a flexible reservoir is placed around a cable splice. The reservoir is positioned so that it completely surrounds the splice area. The ends of the reservoir are sealed to the adjacent cables. The reservoir has at least one opening at the top thereof to permit filling the reservoir with a curable liquid sealant. Preferably, such opening is virtually coextensive with the reservoir permitting rapid filling of the reservoir. The reservoir is preferably of a polymeric material and preferably is of a material which bonds or adheres to the sealant used to fill the reservoir. In a preferred embodiment, the reservoir is formed from a plastic film, just prior to filling with the sealant. The plastic film must be sufficiently strong to support the weight of the liquid sealant. A preferred plastic film is of nylon, having a thickness of about 1 to about 2 mils. Film of various thicknesses can be used. The thickness of a particular film necessary to support the weight of the sealant depends on the material of the film. Other means of providing a flexible reservoir about the splice area can be used.

Support means are preferably provided in combination with the plastic film. Such support means can be, for example, plastic rods adhered to the outer surface of the film. Another preferred support means is a porous liner adhered to the inside surface of the reservoir formed by the film. The liner is preferably of a material which is compatible with the liquid sealant. The liner can be, for example, a flexible polymeric open-celled foam sheet of a thickness from about 0.1 inch to about 1.0 inch, preferably from about 0.2 to about 0.5 inch. A relatively inflexible liner such as a porous corrugated rigid sheet of plastic can also be used. When such a liner is used, it should not prohibit or interfere with compression of the reservoir. For example, the size of the liner can be such that when the reservoir is positioned around the splice area, the edges of the liner do not meet. Compression of the reservoir then forces the edges of the liner together.

The support means is secured to the reservoir with an adhesive, preferably a pressure sensitive adhesive. The support means can be used alone or in conjunction with other support means. For example, support rods may be used along with a flexible liner, if additional support is desired.

The curable liquid sealant used can be any curable liquid system pourable at room temperature and hardening, preferably to a gel-like consistency within a relatively short period of time. Sealants of this type are well known in the art and many are commercially available. Liquid sealant systems used to encapsulate cable splices are generally two-part polyurethane or epoxy compositions. Typically, a polyurethane system comprising a prepolymer and a curing agent are supplied separately to be combined just prior to use.

In the practice of this invention, the curable liquid sealant is poured into the flexible reservoir. Air trapped in the reservoir can be removed, if desired, by kneading or messaging the flexible reservoir. Air bubbles are forced to the top and the reservoir can be pierced to allow air to escape. This kneading step can be accomplished by wrapping a first layer of tape, preferably transparent, around the reservoir while applying slight pressure to the tape.

The reservoir, filled with liquid sealant, is then compressed to apply pressure on the sealant. This is accomplished by applying pressure to the outer walls of the flexible reservoir forcing the reservoir to assume a smaller volume. Such pressure forces the liquid sealant into the interstices in the splice bundle and into the adjacent cable. The sealant penetrates the cable core and between the layers of the cable sheath. Compression is maintained while the sealant hardens, preferably to a gel-like consistency, forming a water impenetrable seal surrounding and throughout the splice bundle and the adjacent cable.

The flexible reservoir can be compressed by any suitable means. A simple expedient is to pressure wrap the reservoir. This can be done by wrapping at least one layer of tape to the outside of the reservoir. The tape is applied under tension and preferably is of an elastomeric material. As the elastomeric tape is applied, it is stretched and elastic recovery forces continue to exert pressure on the reservoir after it has been applied. The tape used can be, for example, a vinyl tape, but is preferably "double rubber" tape, an elastomeric tape commercially available from Plymouth Rubber Co., Inc. Other means of compressing the flexible reservoir can be used.

Compression of the reservoir exerts pressure on the liquid sealant in the reservoir. It is this pressure which forces the sealant to penetrate into the interstices of the space bundle and into the adjacent cable. The pressure applied is preferably from about 3 to about 12 pounds per square inch depending on the means used to compress the reservoir. Pressure of up to about 10 pounds per square inch will be adequate for most sealant/reservoir combinations. Of course, the pressure should not be so great as to cause damage to the cable, the cable sheath or any part of the splice.

Penetration of the sealant some distance along the cable core results in a highly desirable cable block protecting the splice from water migrating along the cable core or between the layers of the cable sheath. In the practice of this invention, this is accomplished by compressing the flexible reservoir filled with liquid sealant. To insure that adequate penetration of the cable core is obtained, the sheath of the cable can be slit or "tabbed" a short distance, generally a couple of inches, up from the splice area. A porous insert is then positioned under the slit cable sheath between the sheath and the cable core providing a pathway for sealant to flow from the reservoir up the cable. The porous insert can be for example, a strip of net or foam, and in a preferred embodiment, is a porous corrugated rigid strip of plastic. Tabbing or slitting of the cable sheath in this manner also facilitates installation of a bond clamp for attaching a ground connector.

FIG. 1 shows a splice between cables 1 and 2 which are multi-wire communication cables each containing 300 pairs of wire conductors. A flexible reservoir, 3, is formed from a plastic film, in this case a nylon film. The reservoir is formed by placing the nylon film around the splice area, 4, and taping the ends of the sheet to the adjacent cable sheath. The taped ends, 5, of the sheet form a fluid tight seal between the reservoir and cable. The reservoir is supported by support rods on each side thereof, adhered to the outer surface of the film. Support rod, 6, on one side of the reservoir is shown in the FIG. 1. The reservoir, 3, encompasses the entire splice area, 4, which contains the individual conductors, 7, shown here joined by modular connectors, 8.

To more clearly illustrate formation of the reservoir, in FIG. 2, a sheet of nylon film, 10, forms a reservoir, 3, around the splice bundle, 11, containing the individual conductors, 7. The support rods, 6, are each coated with a pressure sensitive adhesive and adhered to the outer surface of the nylon film. The nylon film is positioned and secured to the cable so that a flap, 12, is created. The flap is folded over the opening of the reservoir after it has been filled with liquid sealant. After filling and closing the reservoir, the filled reservoir is compressed, in accordance with this invention, to force the sealant into the splice bundle and adjacent cable core. This can be accomplished by compression wrapping the reservoir by one or more layers of tape.

In the preferred embodiment a first layer of transparent polymeric tape is applied under light pressure. This tape provides a fluid tight seal around the reservoir. Application of the tape with slight compression forces the liquid sealant to penetrate into at least the outer perimeter of the splice bundle and forces any entrapped displaced air to the surface of the liquid sealant. Such entrapped air can be removed by piercing the plastic film and tape to allow the air to escape. An additional wrap of the transparent tape seals any holes so made. In FIG. 3 this first wrap of tape, 13, is over-wrapped with a second layer of tape, 14, which is applied under pressure to compress the sealant-containing reservoir. This second layer of tape is a commercially available tape made of butyl rubber and identified as "Double Rubber" tape. As the tape is applied under pressure it is stretched. Since it is of an elastomeric material, it will continue to exert additional pressure on the compressed reservoir due to the elastic recovery forces of the stretched material. Other tapes, such as vinyl tape, can be used.

The compression wrapped taped splice can be protected against mechanical damage by enclosing the splice in a conventional splice case or other enclosure. A preferred enclosure is illustrated in FIG. 4. In FIG. 4, the splice, 20, joining cables, 21, and, 22, is enclosed in a liner, 23. The liner can be, for example, a metal, eg., aluminum canister or a thermoplastic sheet laminated to a foam layer such as the liner described in copending commonly assigned application Ser. No. 228,349, filed Jan. 26, 1981, the disclosure of which is incorporated herein by reference. Over the line, 23, is a heat recovered polymeric sleeve, 24. The polymeric sleeve preferably is adhered to the cables, 21, and, 22, by an adhesive, preferably a hot melt adhesive, forming an environmental seal around the splice. The heat-recoverable sleeve can be a tubular sleeve or wraparound sleeve of the type known in the art. For example a suitable wrap-around heat recoverable sleeve is described in U.S. Pat. No. 3,455,336, to Ellis. Dimensionally recoverable sleeves which do not require heat for recovery, such as those described in U.S. Pat. Nos. 4,070,746 and 4,135,553 for example, can also be used.

The technique of protecting a splice in accordance with this invention can be used to protect splices between filled cables and/or unpressurized air core cables. It can also be used in a splice terminating a pressurized air core cable or connecting a pressurized cable to a non-pressurized one. In this case, the cable block prevents escape of pressurized air or other gas from the pressurized cable. The technique can be used to protect splices in multi-wire electric cables of any size but is particularly suitable for use with larger cables, ie., those containing 400 pairs or more of individual wire conductors. The technique is particularly useful when at least one of the cables of the splice is filled with a grease-based filling composition.

What is claimed is:

1. A method of protecting a splice connecting at least two multi-wire electrical cables from ingress of water, each of said cables having an outer sheath of at least two layers of material and an inner core comprising a plurality of individual insulated wire conductors haaving interstices therebetween, which comprises:
   (a) positioning a flexible reservoir about the splice, said reservoir comprising a polymeric material and having at least one opening therein and being sealed at each end thereof to the outer sheath of the cables adjacent said splice;
   (b) introducing a curable liquid sealant into said reservoir through said opening and then closing said opening;
   (c) compressing said reservoir at a pressure which forces said liquid sealant to penetrate into said splice and into the interstices between the conductors in the core of said cables adjacent said splice; and
   (d) maintaining said reservoir under said pressure for a period of time sufficient to permit said liquid sealant to cure thereby forming a water impenetrable seal.

2. A method according to claim 1 wherein said pressure is from about 3 pounds per square inch.

3. A method according to claim 1 wherein the said pressure is from about 3 to about 12 pounds per square inch.

4. A method in accordance with claim 1 wherein the step of compressing said reservoir comprises wrapping at least one layer of tape under pressure around said reservoir.

5. A method according to claim 4 wherein the step of the compressing said reservoir further comprises wrapping a second layer of tape over said layer of tape whereby when the second layer of tape is applied under pressure it is stretched.

6. A method according to claim 1 wherein said reservoir comprises a plastic film in combination with a support means comprising a sheet of porous material which is adhered to the inside surface of the reservoir formed by the film.

7. A method according to claim 1 wherein said reservoir comprises a plastic film in combination with a support means comprising plastic rods adhered to the outer surface of the film.

8. A method according to claim 6 wherein the sheet of porous material comprises a rigid sheet of polymeric material having a plurality of apertures therein.

9. A method according to claim 6 wherein the sheet of porous material comprises a sheet of flexible open celled polymeric foam.

* * * * *